3,077,151
MEANS FOR MAKING VISIBLE ADJUSTABLE VALUES OF RELEVANT FACTORS IN A FIELD OF VIEW
Otto Weller, Asslar, Germany, assignor to Ernst Leitz Gesellschaft mit beschränkter Haftung, Wetzlar, Germany
Filed Sept. 15, 1959, Ser. No. 840,152
Claims priority, application Germany Sept. 15, 1958
6 Claims. (Cl. 95—10)

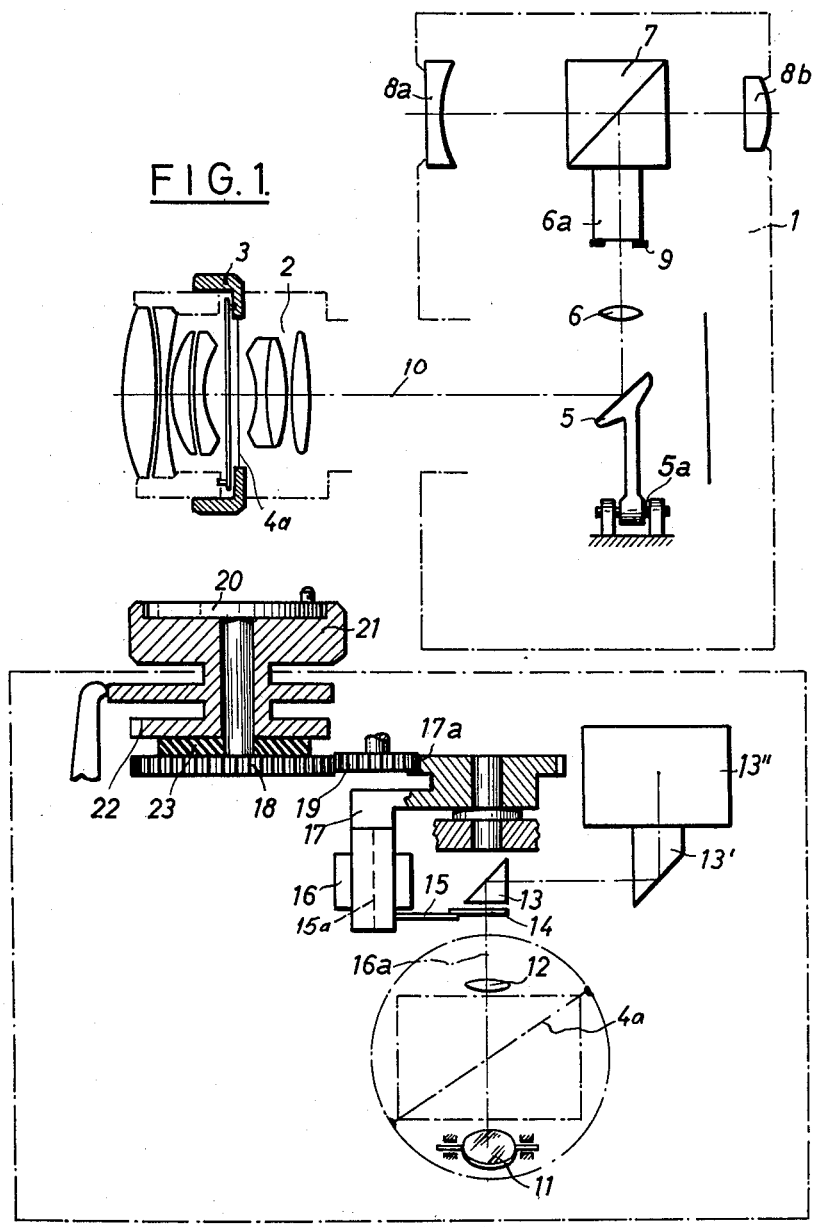

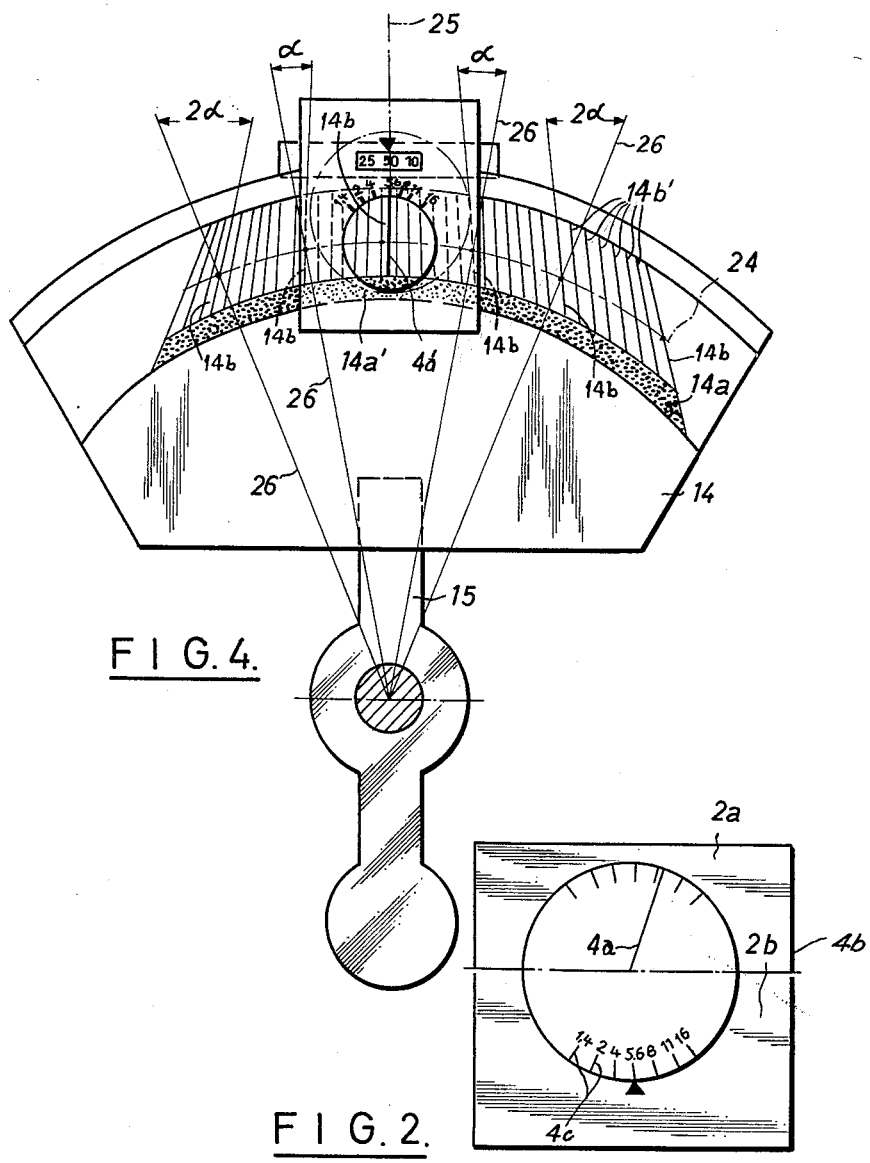

The present invention relates to an optical device for indicating in a given field of view the values of adjustable relevant factors particularly in photographic or kinematographic cameras.

In photographic or kinematographic cameras it is desirable to have available a device of the nature referred to, whereby certain relevant adjustable factors such as, for example, diaphragm openings and exposure time values can be made visible in a given field as view as, e.g., in the field of view of the range finder.

It has already been tried in the art to provide a device making it possible to make certain values visible together with other adjustable values in a common field of view. For that purpose the adjusting means for setting the relevant factor are provided with indicating means disposed out of the range of the path of rays and by providing additional optical means making visible the indicating means in a common field of view. It has also become known to use a so-called optical coupling means between the two adjustable values made visible together in the common field of view. The path of rays of this optical coupling is entirely independent from the path of rays of the optical system.

These known arrangements are complicated, expensive and unsatisfactory and it is the object of the present invention to provide a comparatively simple, inexpensive, and reliable means for making visible adjustable relevant factors in a field of view particularly in cameras.

According to the present invention the indicating means is disposed in the path of rays of the optical system and the afore-referred to additional optical means are disposed in the path of rays of the optical system at the side of the latter directed towards the area where the image is produced.

The device of the invention can be advantageously applied to a photographic or cinematographic camera wherein the adjusted opening of the objective diaphragm is indicated by providing the diaphragm with indicating means as well as additional optical means making the indicating means visible in the field of view of the range finder or another device having a field of view. The indicating means can be disposed in the diaphragm plane or in its vicinity or in front of or behind the objective in the path of rays of the objective so that the image produced by the objective is not disturbed by the indicating means.

The indicating means may consist of a thread disposed diametrically in the path of rays of the objective, or it may consist of a transparent plate with a diametrical pointer mark upon it or with a scale disposed at the circumference of the transparent plate. The indicating means can be directly coupled with the iris diaphragm of an optical system and thus the position of this diaphragm can be indicated.

It is also possible to make visible in the field of view of the range finder of a camera the position of a filter before the objective. In a similar manner other relevant, adjustable factors can be made visible such as the exposure time, or the light value in a camera having a built-in exposure time control device. It is also possible to have separate indicating means for both the diaphragm and the time value. It is, however, also possible to have a single indicating means for the light value whose distribution among the diaphragm and exposure time values is then effected by known mechanical means such as, for example, a differential gear arrangement.

The invention will be more fully appreciated upon the following description of the accompanying drawings, wherein, FIGURE 1 is a schematic view of the essential elements of a photographic camera with an exchangeable objective and a diaphragm equipped with indicating means disposed in the path of rays and additional optical members making visible the indicating means in the path of rays of the range finder of the camera;

FIGURE 2 is a plan view of a field of view obtained by the device of the present invention, and where the upper portion 2a illustrates the field of view as obtained by indicating means consisting of a linear division mark disposed diametrically in the path of rays with respect to a plurality of stationary reference points, the lower portion 2b showing the field of view obtained by indicating means consisting of a graticule provided with diaphragm values, and a stationary indicating mark;

FIGURE 3 is a schematic view of part of a photographic camera having a semi-automatic exposure control device of the follow-up pointer system, in combination with the device of the present invention;

FIGURE 4 is a schematic view of a portion of the camera shown in FIGURE 3 illustrating the transparent disk with indicating lines of the device of the invention;

Referring now to the drawings more in detail and turning first to FIGURE 1, the objective 2 of a camera is exchangeably connected with a casing 1 and is provided with a diaphragm adjusting ring 3 which latter is fixedly connected with indicating means. These indicating means can consist of an indicating pointer mark 4a, for example a thread, diametrically disposed in the path of rays 10 or a plane-parallel plate 4b with a diametrically disposed pointer line upon it or a transparent plate 4c with circumferentially spaced division marks (see FIGURE 2), connected with the diaphragm adjusting ring 3 and rotatable with the latter. A deviating mirror 5 is disposed in the path of rays of the objective at the side of the latter directed towards the image; this deviating mirror 5 is hingedly mounted as at 5a and can be swivelled out of the path of rays depending on the release of the shutter. Furthermore, there are provided an auxiliary optical lens 6 which may comprise an additional glass body 6a, a field of view diaphragm 9, an optical mixer 7 and the range finder lens system 8a, 8b. An image of the position of the indicating means is obtained in the path of rays of the range finder 8a, 8b, via the deviating mirror 5, the auxiliary optical lens 6, and, if desired, a glass body 6a, and the optical mixer 7. The auxiliary optical lens and, if desired, the glass body 6a, are so adapted that an image of the indicating means is produced in the field of view diaphragm 9 disposed at the glass body 6a, or in the vicinity of the diaphragm 9. This image can then be viewed by the range finder eye piece in the range finder field of view via the optical mixer 7. The dimensions of the field of view diaphragm to be employed is determined by the smallest adjustable diaphragm opening of the objective diaphragm.

It will be appreciated that the indicating means, e.g. thread 4a, is arranged at least in the vicinity of the plane of diaphragm of the objective 2 and hence cannot disturb the picture produced by the objective 2.

In FIGURE 2 there are illustrated portions of the views which one will obtain through the view-finder of the camera. The upper portion of FIGURE 2, indicated as 2a, is a view of the diametrically extending thread 4a together with a number of reference points, and the lower portion of the figure, indicated as 2b, is a view of a plurality of indicating marks together with a stationary reference point. The reference points in both 2a and 2b are not at the diaphragm and may be fixed in the plane of the field of view diaphragm. The relationship between the indicator marks and the stationary reference points will give an indication of the adjusted diaphragm opening.

In the embodiment of FIGURE 1 the deviating mirror 5 is disposed in the range of the axial rays of the objective 2. This is particularly advantageous where the camera is equipped with an exchangeable objective, so that objectives of different focal lengths are used and where, consequently, different diaphragm positions are to be considered. It is, however, also possible to have the deviating mirror located at the edge of the path of rays at the side of the objective directed towards the image as shown, e.g., with respect to mirror 11 in FIGURE 3. It is to be noted that conventional means can be provided for adjusting the mirror so as to adapt its position to the particular focal length of the objective.

The illumination of the indicating means in the field of view of the range finder can be positioned at the edge of the field of view as known per se.

4a and 4c are both indicating marks which are positioned in the path of the light rays passing through the objective of the camera. Accordingly, both 4a and 4c are equivalent. It is pointed out, however, that 4a, which is the diametrically extending thread, will be visible at all times regardless of the size of the diaphragm opening, whereas 4c, the circumferentially spaced marks, are visible only when the diaphragm is open to about its maximum position.

Accordingly, 4c is particularly suited for use in objectives equipped with preselection diaphragms since the indicator marks will be visible only when the diaphragm is opened completely or almost completely. The indicating marks can be connected with the preselection ring of the diaphragm.

In the embodiment shown in FIGURE 3 of the drawings the diaphragm adjusting means is again connected with indicating means consisting, e.g., of an indicating pointer mark 4a diametrically extending across the path of rays 16a. Further, there are provided the deviating mirror 11 disposed at the edge of the path of rays of the objective at the side of the latter directed towards the image, and the auxiliary optical means 12. An image of the pointer mark 4a is produced in an intermediate image plane at the prism 13, via the deviating mirror 11 and the auxiliary optical means 12. A grid plate 14 is disposed in the plane of the intermediate image which grid plate is connected with the pointer 15 of the rotary coil instrument 16. The structure and operation of such grid plates in cameras is known in the prior art. The intermediate image can be viewed by means of the range finder eye piece via the deviating prisms or mirrors 13, 13', and 13''.

The rotary coil instrument 16 is mounted on the support 17 about the optical axis 16a of the path of rays of the intermediate image. The support 17 is connected with the adjusting member 20 via its toothed surface portion 17a, and the gears 18 and 19. The adjusting member 20 is disposed co-axially with respect to the exposure time adjusting button 21 which latter is in force-locking connection with gear 18 via the flange 22 and a friction disc 23. The exposure time adjusting button 21 can be adjusted to particular exposure values with respect to a fixed adjusting mark at the camera casing in a manner known per se. The adjusting member 20 is displaceable relative to the exposure time adjusting button 21 for the adjustment of additional constant factors such as, for example, film sensitivity, filter factors or the like.

In the afore-described embodiment the correct measuring position and hence the accurate adjustment of diaphragm and exposure have been attained whenever the indicating means, e.g. the indicating pointer mark 4a, run parallel with the pointer lines of a grid plate (to be described presently) in the range finder field of view. Since, however, during the adjustment the grid plate performs a pivoting removement about the pointer 15 of rotary coil instrument 16, as well as a rotary movement about the axis of rotation of support 17, the pointer lines on grid plate must be arranged in a particular manner, taking into account both the adjustment intervals of the adjusting members for diaphragm and exposure, and avoiding crossing pointer lines. A grid plate with such pointer lines will next be described with particular reference to FIGURE 4 of the drawings.

The afore-mentioned grid of pointer lines 14b, 14b' can be viewed through the eye piece of the range finder of the camera via the mirror elements 13, 13', 13'', together with viewing the indicating means such as 4a or 4b of the adjustment of the diaphragm. With a given adjustment of the diaphragm and a given light intensity a particular group of pointer lines 14b, 14b' of the plate 14 becomes visible in the field of view of the range finder, which pointer lines would normally be more or less inclined and intersected by the indicating means such as 4a representing the diaphragm adjustment. However, since the entire measuring instrument 16 can be turned about the optical axis of the plane of the intermediate image of the viewing means, such as the eye piece of the range finder, and since the displacement of the instrument 16 is effected depending on the adjustment of the exposure time adjusting button 21 of the camera, the grid plate 14 can be turned by a corresponding adjustment of button 21 until the pointer lines appearing in the field of view of the viewing means have come to be located parallel relative to the indicating means 4 indicating the diaphragm position. Since the exposure time adjusting button 21 of the camera is coupled with the rotary coil instrument 16 and since the group of grid lines of plate 14 as seen in the field of view moves in rightward direction for long exposure times and moves leftwardly with short exposure times, and since the indicating means 4 indicating the diaphragm position turns rightwardly with small diaphragm openings and turns leftwardly with large diaphragm openings there is no difficulty in getting the proper combination of diaphragm and exposure time values by correspondingly adjusting the transmission means between the button 21 and the rotary coil instrument 16.

It will be understood that this invention is susceptible to modification in order to adapt it to different usages and conditions and, accordingly, it is desired to comprehend such modifications within this invention as may fall within the scope of the appended claims.

What I claim is:

1. A photographic camera comprising a casing, a view-finder in said casing, an objective mounted on said casing, means on said objective for adjusting the diaphragm opening thereof, indicating marks positioned in the path of light rays entering said objective and positioned in response to said diaphragm adjusting means, and optical means in the path of said objective light rays on the image side of said objective for projecting the image of said indicating marks onto said view-finder, said indicating marks being positioned at a distance from the plane of the diaphragm less than the focal length of said objective so that the image of said object to be photographed as received through said objective will not be affected by the image of said indicating marks.

2. A photographic camera comprising a casing, a view-finder in said casing, an objective mounted on said casing, an adjustable diaphragm in said objective, means on said casing for adjusting the exposure time of the camera, a light meter in said casing responsive to the light received from the object to be photographed, means connected to said light meter for indicating the light value received thereby, means in the path of light received passing through said objective for indicating the adjusted position of said diaphragm, an optical coupling for combining the indicated values of said light value measuring means and said diaphragm adjusting means, and optical means in the path of light received passing through said objective at the image side thereof for projecting said indicated values onto said view-finder.

3. A photographic camera as claimed in claim 2 wherein said light value measuring means are rotatably mounted and further comprising means on said casing for adjusting a photographic factor of said camera in addition to the exposure time and the diaphragm opening, and means for drivingly connecting said last-mentioned adjusting means with said rotatably mounted light measuring means.

4. A device in a camera as described in claim 1, with said indicating marks being disposed at least in the vicinity of the plane of diaphragm of said objective.

5. A device in a camera as described in claim 1 with said indicating marks consisting of a thread.

6. A device in a camera as described in claim 1 with said indicating marks including a transparent plate, there being visible marks on said plate.

References Cited in the file of this patent

UNITED STATES PATENTS

| | | |
|---|---|---|
| 2,026,675 | Edwards | Jan. 7, 1936 |
| 2,112,701 | Leitz | Mar. 29, 1938 |
| 2,191,414 | Sauer | Feb. 20, 1940 |
| 2,197,194 | Sauer | Apr. 16, 1940 |
| 2,197,939 | Leitz | Apr. 23, 1940 |
| 2,360,256 | Mihalyi | Oct. 10, 1944 |
| 2,909,109 | Back | Oct. 20, 1959 |
| 2,914,997 | Grey | Dec. 1, 1959 |

FOREIGN PATENTS

| | | |
|---|---|---|
| 757,879 | Germany | Oct. 12, 1953 |
| 853,260 | Germany | Oct. 23, 1952 |